3,573,926
PROCESS FOR PREPARING ENRICHED RICE
Ichiro Chibata, Toyonaka-shi, and Hiroshi Ito, Nishinomiya-shi, Japan, assignors to Tanabe Seiyaku Co., Ltd., Osaka, Japan
No Drawing. Filed Feb. 9, 1968, Ser. No. 704,273
Claims priority, application Japan, Feb. 16, 1967, 42/9,966
Int. Cl. A23l 1/30, 1/10
U.S. Cl. 99—11                    4 Claims

ABSTRACT OF THE DISCLOSURE

A method of enriching polished rice wherein the rice is soaked in an aqueous solution of a water-soluble thiamine salt followed by treatment with alkaline material. The treatment may also be followed by glutenization of the surface of the rice as by steaming.

---

This invention relates to an improved process for preparing enriched rice using water-soluble salts of thiamine.

It has been known that the vitamin $B_1$ content of the polished rice is fortified by soaking the rice in an aqueous solution containing a water-soluble salt of thiamine. However, the enriched rice obtained by the known method has the disadvantage that a considerable amount of thiamine is lost when the rice is washed with water, because the thiamine is impregnated into the rice tissue in the form of its soluble salts. For the purpose of avoiding such loss of thiamine, it has been attempted to glutinize the surface layer of the rice by steaming the soaked rice, however, this produces an unsatisfactory result. It also gives the rice a tendency to crack into small pieces.

We have found that the aforementioned disadvantages can be overcome by treating the rice with an alkali after soaking in the thiamine solution. According to the present invention, this method has been carried out by soaking the rice in an aqueous solution containing a water-soluble salt of thiamine such as thiamine hydrochloride, thiamine nitrate, etc., and treating the rice with an alkali for a short period of time.

In a preferred embodiment of the present invention, the alkaline treatment is carried out by contacting the rice with an aqueous alkaline solution having a pH of higher than about 8.5 throughout the process. For this purpose, aqueous solutions of an alkaline compound such as ammonia, sodium hydroxide, sodium carbonate, etc., are preferably used. The suitable pH range of the alkaline solution is about from 8.5 to 9.2. Although there is a tendency for the more concentrated alkaline solution to result in less washing loss of thiamine, the use of highly concentrated alkaline solution caused either the deterioration of thiamine or coloring the rice to pale yellow. An adequate volume of the alkaline solution is about 40–50 ml. per kilogram of rice. Under the abovementioned conditions, the rice is stirred for a few minutes in an alkaline solution and the solution drained off from the rice. Then, the moistened rice obtained by the foregoing process is dried in the usual manner.

In an alternative embodiment of the present invention, the alkaline treatment, the alkaline treatment can be carried out by exposing the rice to ammonia gas. The enriched rice thus prepared shows much less washing loss of thiamine. Moreover, the rice has the same appearance as when untreated, and shows no difference in taste, smell, etc. In order to prevent the washing loss of thiamine, more effective results can be obtained by allowing the rice treated by the present method to be subjected to further steaming treatment until the surface layer of he rice is glutinized.

The following experiments indicate distinguishable effects of the present method in comparison with known method.

EXPERIMENT

Polished rice is enriched by the following four methods and the comparison of the washing loss to the respective samples is conducted by the testing method stated below.

Preparation of enriched rice

Sample A: This is prepared by soaking the rice in an equal amount of 0.3% aqueous solution of thiamine (nitrate) at room temperature for 2 hours and drying in air at 70° C.

Sample B: The rice prepared in the same thiamine solution as Sample A is exposed to steam for 3 minutes and dried in air at 70° C.

Sample C: The rice prepared in the same thiamine solution as Sample A is moistened with a small amount of 0.8% aqueous solution of sodium hydroxide for 3 minutes and dried in air at 70° C.

Sample D: The rice in the same thiamine solution as Sample A is moistened with a small amount of 0.8% aqueous solution of sodium hydroxide for 3 minutes, exposed to steam for 3 minutes and dried in air at 70° C.

Testing method 5 g. of each sample is moderately stirred with 50 ml. of distilled water in an Erlenmeyer flask of 100 ml. volume. After allowing to stand for 10 minutes at room temperature, the rice is filtered on a filter paper. The rice and the filter paper are washed with distilled water until the total volume of the filtrate and the washings become 100 ml. The washing loss of thiamine is calculated from the contents of thiamine in the solution obtained by the foregoing procedures. The results are shown in Table I.

TABLE I

| Enriched rice: | Washing loss of thiamine, percent |
|---|---|
| Sample A | 30 |
| Sample B | 16 |
| Sample C | 10 |
| Sample D | 7 |

EXAMPLE 1

3.0 g. of thiamine nitrate is dissolved in one liter of water and one kg. of the rice is soaked in the solution for 2 hours at room temperature with moderate stirring. After draining off the solution, the rice is stirred with 40 ml. of 0.8% aqueous solution of sodium hydroxide for 3 minutes. Then, the rice is steamed for 3 minutes and dried in air at 70° C. Thus, enriched rice containing 1.5 mg./g. of thiamine calculated as its hydrochloride is obtained. The washing loss assayed by the method stated in the Experiment is 6.8%.

EXAMPLE 2

3.6 g. of thiamine hydrochloride is dissolved in one liter of water and one kg. of the rice is soaked in the solution for 2 hours at room temperature with moderate stirring. After draining off the solution, the rice is stirred with 50 ml. of 3% aqueous ammonia for 3 minutes. Then, the rice is steamed for 3 minutes and dried in air at 70° C. Thus, enriched rice containing 1.5 mg./g. of thiamine calculated as its hydrochloride is obtained. The washing loss assayed by the method stated in the Experiment is 7.0%.

EXAMPLE 3

6.0 g. of thiamine nitrate is dissolved in two liters of water and 2 kg. of the rice is soaked in the solution for 2 hours at room temperature with moderate stirring. After draining off the solution, the rice is stirred with 90 ml. of 1.0% aqueous solution of sodium carbonate for 3 minutes. Then, the rice is steamed for 3 minutes and dried in air at 70° C. Thus, enriched rice containing 1.5 mg./g. of thiamine calculated as its hydrochloride is obtained. The washing loss assayed by the method stated in the Experiment is 7.3%.

EXAMPLE 4

3.0 g. of thiamine nitrate is dissolved in one liter of water and one kg. of the rice is soaked in the solution for 2 hours at room temperature with moderate stirring. After draining off the solution, the rice is exposed to ammonia gas for 5 minutes until the rice shows yellowish color. Then, the rice is steamed for 3 minutes and dried in air at 70° C. Thus, enriched rice containing 1.5 mg./g. of thiamine calculated as its hydrochloride is obtained. The washing loss assayed by the method stated in the Experiment is 8.1%.

What is claimed is:

1. A process for preparing enriched rice which comprises soaking the rice in an aqueous solution containing a a water-soluble salt of thiamine for a sufficient time to enrich said rice, treating said rice with a diluted aqueous solution having a pH of about 8.5 to about 9.2, said alkaline solution being present in an amount of from about 40 to about 50 ml. per kilogram of rice, and drying said rice.

2. A process for preparing enriched rice which comprises soaking the rice in an aqeuosu solution containing a water-soluble salt of thiamine for sufficient time to enrich said rice, contacting the rice with ammonia gas until a yellowish color is obtained, and drying said rice.

3. A process for preparing enriched rice which comprises soaking the rice in an aqueous solution containing a water-soluble salt of thiamine for a sufficient time to enrich said rice, treating the rice with an alkali having a pH of at least 8.5, steaming the rice to glutinize the surface of the rice, then drying said rice.

4. A process for preparing enriched rice which comprises soaking the rice in an aqueous solution containing a water soluble salt of thiamine for a sufficient time to enrich said rice, treating the rice with an alkali having a pH of about 8.5 to about 9.2, and drying said rice.

References Cited

UNITED STATES PATENTS

| | | | |
|---|---|---|---|
| 2,390,210 | 12/1945 | Fieger et al. | 99—11 |
| 2,468,930 | 5/1949 | Huber et al. | 99—11X |
| 2,712,499 | 7/1955 | La Pierre | 99—11 |
| 2,775,521 | 12/1956 | Mateles et al. | 99—11 |
| 2,811,447 | 10/1957 | Kamada | 99—11 |
| 2,829,054 | 4/1958 | Feinstone | 99—11 |

RAYMOND N. JONES, Primary Examiner

U.S. Cl. X.R.

99—80